Figure 1:
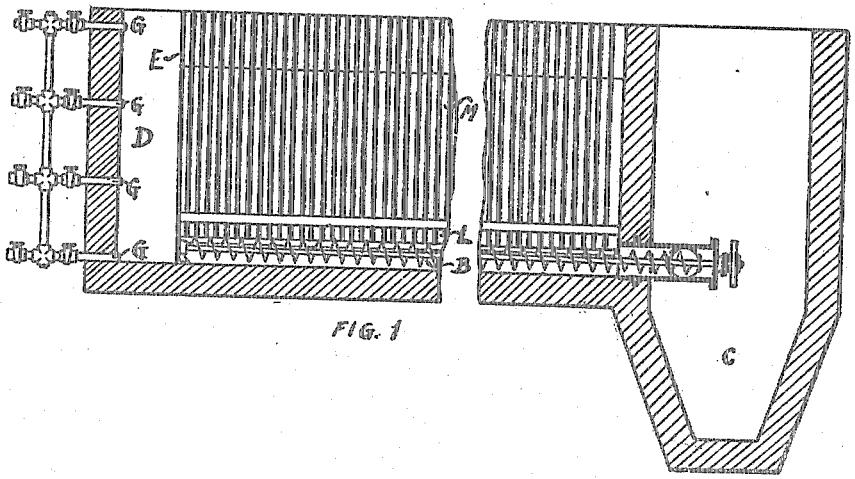

UNITED STATES PATENT OFFICE.

JACOB GROSSMANN, OF MANCHESTER, ENGLAND

METHOD OF CONCENTRATING SEWAGE-SLUDGE.

1,325,787.   Specification of Letters Patent.   Patented Dec. 23, 1919.

Application filed October 6, 1914.   Serial No. 865,305.

*To all whom it may concern:*

Be it known that I, JACOB GROSSMANN, a subject of the King of Great Britain and Ireland, and a resident of Manchester, in the county of Lancaster, England, have invented new and useful Improved Methods of Concentrating Sewage-Sludge, of which the following is a specification.

Sewage is now generally understood to be the refuse matter which is obtained in places where the water carriage system is employed for removing the refuse matter, and sewage sludge is the substance which settles out from said sewage in any process of sewage purification. It is to such sewage sludge that my present invention relates. Attempts have been made to further concentrate the sludge by the ordinary process of settling in which the solid parts gravitate to the bottom of the vessel while the liquid with which they are mixed forms a layer above which on removal leaves a mass containing a larger percentage of solid matter than was present at the outset. But frequently it is difficult and even impossible to effect a satisfactory separation within practicable time by this means and to concentrate sewage sludge in this manner. I have however found that if sewage sludge is mixed with a suitable quantity of sulfuric acid and the mixture left to stand the mass after a comparatively short time separates into two layers, the bottom layer being a comparatively clear liquid and the top layer being sludge of greater concentration. These layers can be easily separated by running off the liquor. Thus one liter of sludge mixed with five grams of sulfuric acid previously diluted with water and placed in a glass jar which it filled to the depth of six inches showed one inch of clear liquor at the bottom after 24 hours standing, 2 inches after 48 hours, and about 3 inches after 72 hours, and after removing the liquor the sludge on top tested about 20% of solid matter whereas the original sludge only tested about 10% of solid matter. In general the operation depends on three factors, viz. the chemical and physical composition of the sludge, the amount of acid, and the time of settling, and the best conditions should be ascertained in each case by experiment, preferably in the laboratory.

In practical work the sludge is mixed in a tank with the requisite quantity of dilute sulfuric acid, or a mixture of sludge and dilute acid is placed into a tank and allowed to stand for such a number of days as has been ascertained to be advisable when the clear or comparatively clear liquor is run off from the bottom, leaving the concentrated sludge in the tank. Any tank with an outlet at the bottom may be used, or a tank may be used in which cinders or other suitable filtering material has been placed at the bottom for further drainage of the concentrated sludge. Preferably I use a tank with or without appliances for mixing the sludge with acid, or with arrangements for preventing the settled sludge from falling down, such as arched or straight cross bars similar to those used in ferroconcrete work, or with such modifications as will improve the working of this process, as, for instance, the arrangement shown in the accompanying drawings which enables me to perform the mixing, the separation of the concentrated sludge, and the further draining of the latter in one and the same tank, by supplying the apparatus with an arrangement of laths or grids which line the tank in such a manner as to form a receptacle for coke, clinkers, suitable stone chippings or other suitable draining material.

Figure 2:
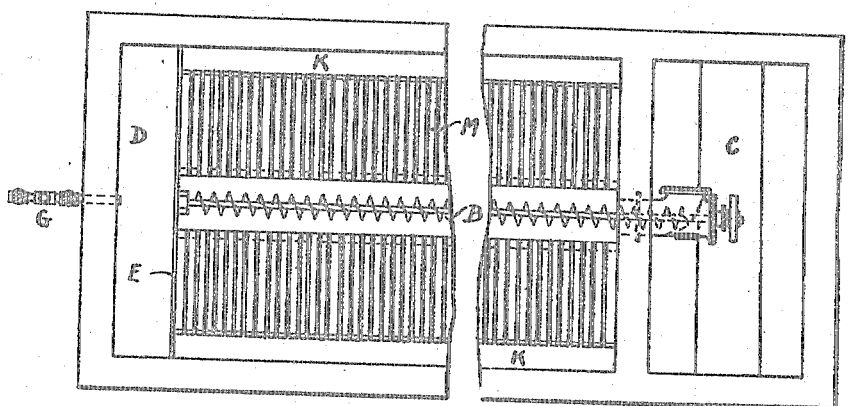
Figure 3:
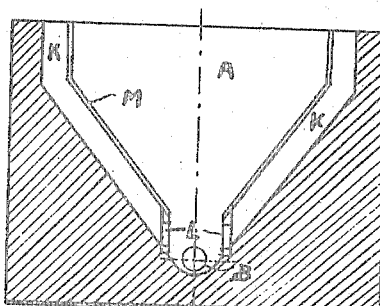

In the accompanying drawings Figure 1 represents a longitudinal section, Fig. 2 a plan and Fig. 3 a cross section of apparatus for carrying the method into effect.

A is a settling tank with a screw conveyer B at the bottom which conveys the sludge after settling to a reservoir C which may act as a boot to an elevator or as a reservoir for storing the sludge prior to its being removed by any other mechanical means. D is the filtering chamber which is separated from the settling tank A by a perforated plate E of known construction and filled with clinkers or other suitable filtering material; M is an arrangement of laths or perforated iron plates which is placed inside the tank A so as to leave a space K between this lining and the walls of the tank. This space is also filled in with suitable filtering material of graded sizes. At the bottom of the space K, tiles or perforated plates L of known construction are placed in such manner as to enable the drainings from the compartment containing the laths or plates M to pass into the lowest part of the tank, and these drainings may either pass into the bottom of the filtering chamber D or may be drawn off separately through pipes (not shown in the drawings) at any convenient part or parts of the tank. The drained liquor from the filtering chamber D may be drawn off through any of the pipes G.

The manner of working these tanks is as follows:—

The sludge from the sedimentation tanks is blown into the tank A simultaneously with the required quantity of sulfuric acid, or the two may be mixed in a separate vessel and then passed into the tank. The mixture is allowed to stand for two, three or more days until separation has taken place after which the clear liquor which has settled to the bottom is drawn off from any of the pipes G or any other part or parts of the tank A as described above.

I have found that "domestic" sludge from sedimentation tanks by settling only, even when fresh i. e., only a few weeks old, will separate well with a proportion of 3 parts of actual $H_2SO_4$ to 1,000 parts of sludge containing about 10% solid matter; some sludge may require more acid, and this must be ascertained by experiment in each case. No heating of the mixture is required, and the process works practically equally well between the ordinary ranges of winter and summer temperature. The theory of the process is not definitely settled. It appears that the process depends to a great extent if not altogether upon the gaseous matters which are evolved on the addition of acid to sludge. If, therefore, a sludge should not contain a sufficient quantity of compounds which evolve with acid the requisite amount of sulfureted hydrogen and other gases it may previous to the addition of acid be mixed with sludge which is richer in such compounds as e. g. septic sludge, or such substances which evolve suitable gaseous matter, as e. g. iron sulfid, calcium sulfid, or spent lime from gas works, alkali waste or drainage from it, calcium or magnesium carbonate or compounds of similar properties.

Instead of using sulfuric acid, hydrochloric or any other suitable acid or mixture of acids may be used, or acid salts such as sodium bisulfate or niter cake, or waste acids or other by-products from manufacturing operations containing free acid.

The liquor which is run off from the bottom of the tank may be used for mixing with crude or settled sewage, or if not clear may be previously settled with or without addition of lime or other precipitants.

Lime or other neutralizing ingredients may be mixed with the concentrated sludge obtained in the settling tank; it may be further concentrated by drainage in suitable apparatus, or by filterpressing or centrifuging or by lagooning, i. e. by drainage on land which has been covered with cinders or other suitable material which will facilitate drainage, or may as such or after further concentration as aforesaid be passed through grease extraction apparatus, or through drying machines for drying by heat or used in connection with any of the processes dealing with the manufacture of manure from sludge or the extraction of grease, or either of these processes, or in conjunction with my U. S. A. Patent No. 1025622 dated May 7th, 1912, or any other process of drying sludge, or of extracting grease from it, or of combinations of the two.

What I claim is:—

1. The method of obtaining concentrated sewage sludge from sewage sludge which settles out of water-carried sewage in any process of purification which consists in mixing such a quantity of acid with the sludge as will by the liberation of gases render its solid constituents specifically lighter than the liquid, but which is insufficient to liberate the fatty acids, as such, and need not exceed six parts of acid to 1000 parts of sludge of 10% solid organic constituents, allowing the mixture to stand until separation has taken place, leaving concentrated sludge above and clear liquor below in well defined layers, and then running off the clear liquor, substantially as described.

2. The method of obtaining concentrated sewage sludge from sewage sludge which settles out of water-carried sewage in any process of purification, which consists in mixing septic sludge with the sewage sludge, adding such a quantity of acid with the sludge as will by the liberation of gases render its solid constituents specifically lighter than the liquid, but which is insufficient to liberate the fatty acids, as such, and need not exceed 6 parts of acid to 1000 parts of sludge of 10% solid organic constituents, allowing the mixture to stand until separation has taken place, leaving concentrated sludge above and clear liquor below, in well defined layers, filtering the liquor, and then running off the clear liquor, substantially as described.

3. The method of obtaining concentrated sewage sludge from sewage sludge which settles out from water-carried sewage in any process of purification, which consists in mixing a quantity of acid with the sewage sludge sufficient to render the solid constituents of the sludge specifically lighter so that they will float but insufficient in quantity to liberate the fatty acids as such, allowing the mixture to stand until separation as aforesaid has taken place, leaving concentrated sludge above and clear liquor below in well defined layers, and then removing the clear liquor.

In witness whereof I have hereunto set my hand in the presence of two subscribing witnesses.

JACOB GROSSMANN.

Witnesses:
FRANK ALDEYS,
MALCOLM SMETHURST,